UNITED STATES PATENT OFFICE.

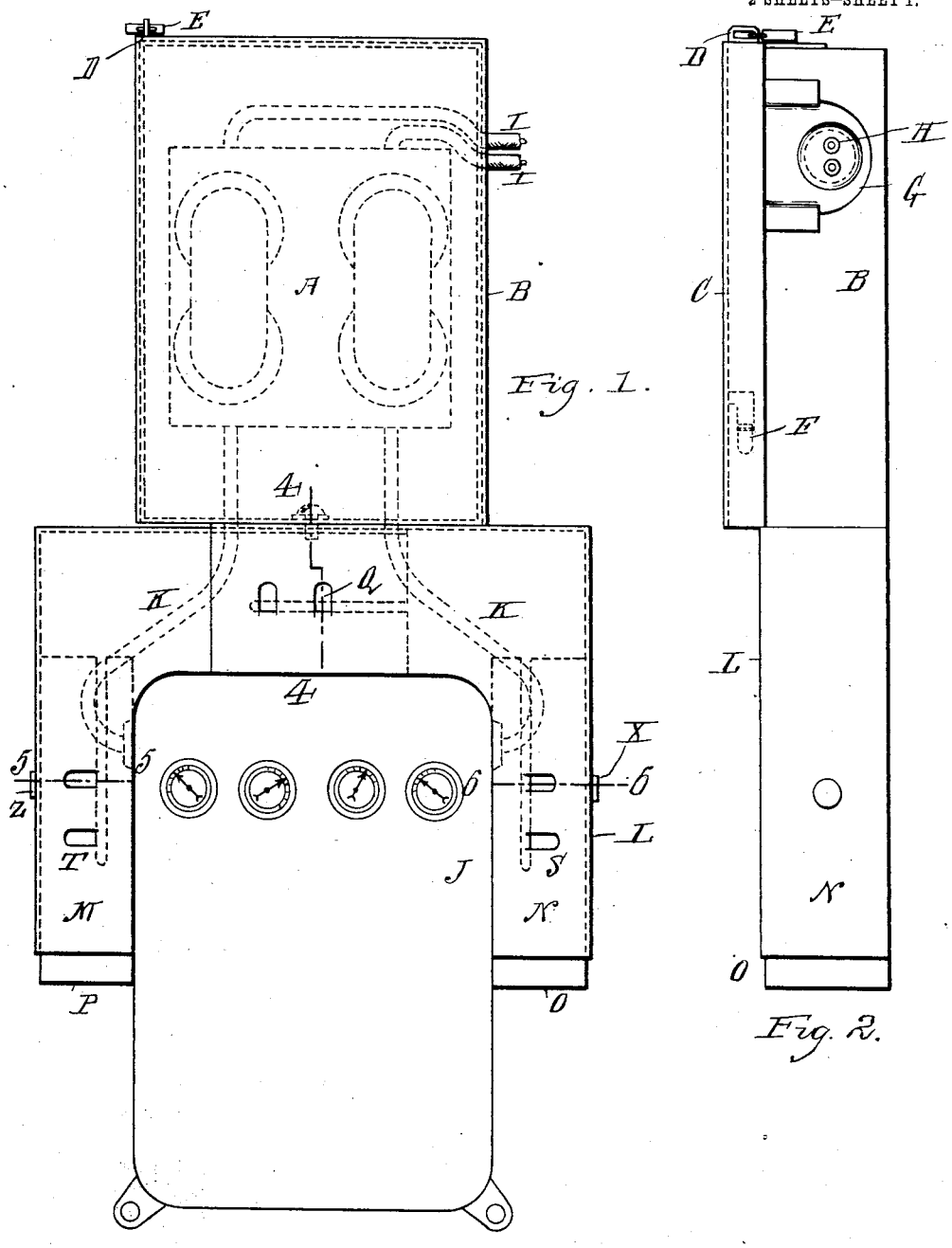

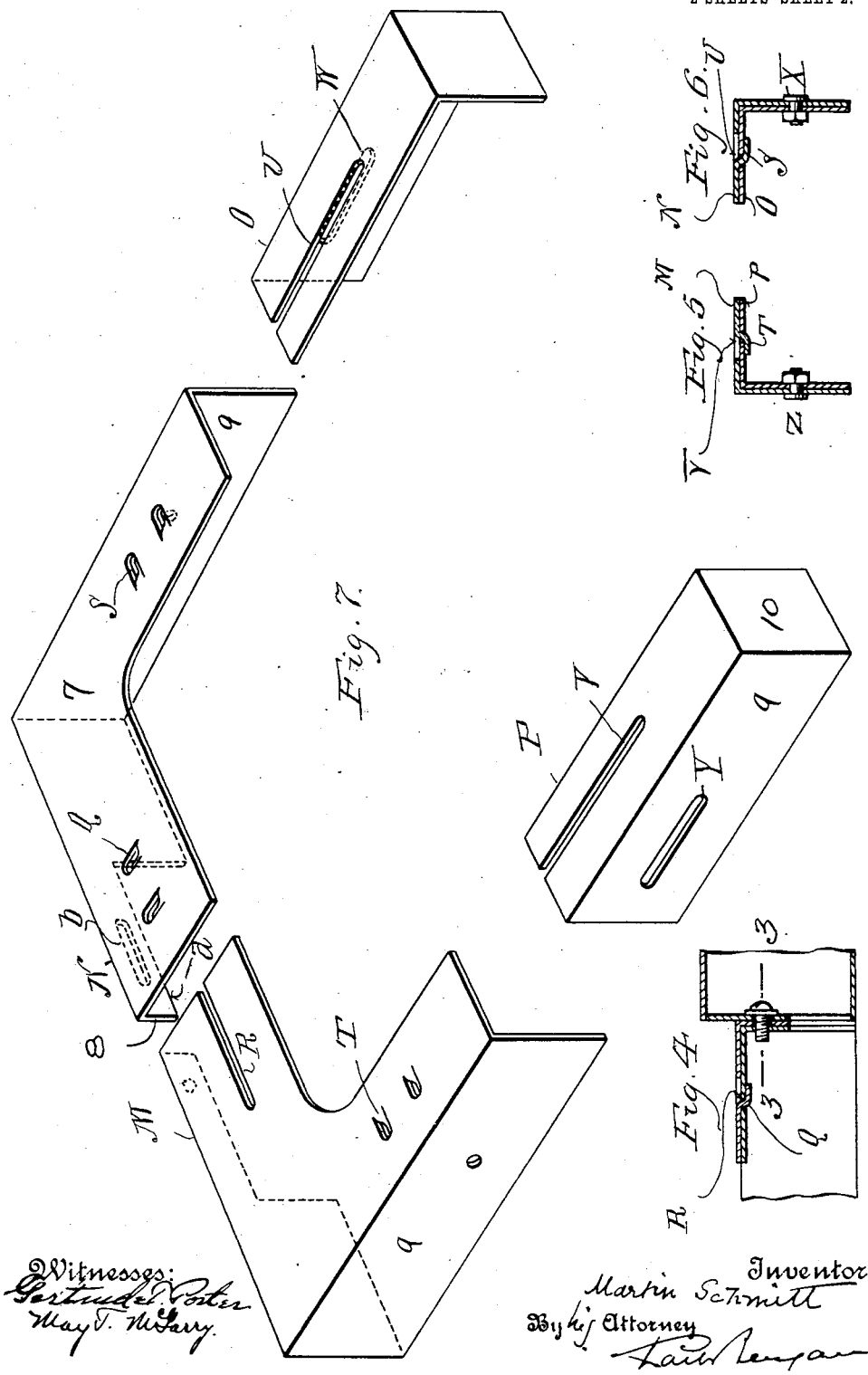

MARTIN SCHMITT, OF BROOKLYN, NEW YORK.

ADAPTER-BOX.

1,048,896.  Specification of Letters Patent.  Patented Dec. 31, 1912.

Application filed April 9, 1912. Serial No. 689,498.

*To all whom it may concern:*

Be it known that I, MARTIN SCHMITT, a citizen of the United States, residing at Brooklyn, in the county of Kings and State of New York, have invented a certain new and useful Improvement in Adapter-Boxes, of which the following is a specification.

The invention relates to an adapter box for interposition between the case of an electric meter and the case of the cut-out block associated therewith, in order to protect the connections between said block and meter.

The invention consists more particularly in the telescopic construction of the adapter box in order to make it fit upon meter cases of different dimensions.

In the accompanying drawings—Figure 1 is a front elevation, showing the box in place between the meter case and the cut-out block box. Fig. 2 is a side elevation. Fig. 3 is a section on the line 3, 3 of Fig. 4. Fig. 4 is a section on line 4, 4 of Fig. 1. Fig. 5 is a section on line 5, 5 of Fig. 1. Fig. 6 is a section on line 6, 6 of Fig. 1. Fig. 7 is a perspective view of the adapter box with its parts separated.

Similar letters of reference indicate like parts.

A, dotted lines, Fig. 1, is any suitable form of cut-out block, inclosed in the metal box B, having a flanged cover C. A lug D extends through the end flange of said cover and receives a seal fastening E. Lugs F on the side flanges of the cover enter slots in the wall of the box B. Near one end of the box is an opening, closed by a sliding plate G, in which plate is any suitable sleeve or bushing H, through which the circuit leads I pass to the cut-out block A.

J is an electric meter case, the terminals of which are connected by the wires K, dotted lines, to said cut-out block.

The adapter box is substantially a U-shaped frame, having a front wall 7, a top wall 8, side walls 9, and at the ends of the arms, bottom walls 10, these designations according with the position of the box, as shown in Fig. 1. Each leg of the U and the cross piece thereof has a telescopic joint, so that the box is made in four parts, M, N, O, P—the part N telescoping with the parts M and O, and the part M telescoping with the parts N and P. Taking said parts in detail: On the front wall of part N are formed tongues Q, which slide freely in a slot R in the front wall of part M. Also on the top wall of parts M and N are formed tongues S, T. The tongues S enter a slot U in part O and slide therein, and the tongues T enter a similar slot V in part P. In the part O is a slot W, through which passes a screw X which engages with part N. In the part P is a similar slot Y, through which passes a screw Z which engages with part M. The top wall in parts M, N is cut away to form a recess $a$ which, when the adapter box is placed against the connection block box B, as shown in Fig. 1, comes opposite to a similar recess in the bottom wall of said connection box. Through said recesses the connections K pass, as already described. The adapter box is secured to the connection box by a screw $d$, Fig. 3, having its head within said connection box, which screw passes through an elongated slot $c$ in the bottom wall of the connection box, an elongated slot $b$ in the top wall of part N, and enters the top wall of part M.

By reason of the foregoing construction, the adapter box may be adjusted to fit meter cases of various widths and to extend along said cases on each side thereof for different distances. The width adjustment is effected by loosening screw $d$ and moving the parts M, N toward or from one another until the selected meter case fits snugly within them, when the screw $d$ is tightened. Similarly, the extent of overlapping of the sides of the meter case by the parts O, P is adjusted by loosening the screws X and Z, moving said parts toward or away from the parts M, N and then tightening said screws.

I claim:

1. An adapter box for meter cases, constructed in sections telescopically adjustable with relation to one another, each section comprising side walls and a top wall, and means for securing said sections in adjusted position.

2. An adapter box for meter cases, constructed in sections telescopically adjustable with relation to one another, each section comprising a front wall and a top wall, and means for securing said sections in adjusted position.

3. An adapter box for meter cases, in U-form, constructed in four sections each of which comprises a side wall, a front wall and an end wall, the said sections being telescopically adjustable with relation to one another.

4. An adapter box for meter cases, in U-form, having a telescope joint in each arm and in the cross-piece uniting said arms.

In testimony whereof I have affixed my signature in presence of two witnesses.

MARTIN SCHMITT.

Witnesses:
GERTRUDE T. PORTER,
MAY T. MCGARRY.

Copies of this patent may be obtained for five cents each, by addressing the "Commissioner of Patents, Washington, D. C."